(12) United States Patent
Raines

(10) Patent No.: US 7,044,309 B2
(45) Date of Patent: May 16, 2006

(54) STRAP MOUNTED MOTORCYCLE CHOCK AND METHOD

(76) Inventor: Walter L. Raines, 12206 Laneview, Houston, TX (US) 77070

( * ) Notice: Subject to any disclaimer, the term of this patent is extended or adjusted under 35 U.S.C. 154(b) by 558 days.

(21) Appl. No.: 10/299,731

(22) Filed: Nov. 19, 2002

(65) Prior Publication Data
US 2004/0093711 A1  May 20, 2004

(51) Int. Cl.
*A47F 5/00* (2006.01)
(52) U.S. Cl. .......................... 211/20; 211/17; 224/42.3
(58) Field of Classification Search ................ 211/20, 211/17, 19, 21, 22, 23; 108/55.3, 55.5; 224/42.3, 224/42.12; 248/288.11
See application file for complete search history.

(56) References Cited

U.S. PATENT DOCUMENTS

| | | | |
|---|---|---|---|
| 1,906,022 A * | 4/1933 | Tobin | 410/21 |
| 3,785,517 A | 1/1974 | Brajkovich | |
| 4,437,597 A | 3/1984 | Doyle | |
| 4,786,223 A * | 11/1988 | Crissy et al. | 410/20 |
| 4,960,353 A * | 10/1990 | Thorndyke | 410/20 |
| 5,011,347 A * | 4/1991 | Bullock | 410/9 |
| 5,301,817 A | 4/1994 | Merritt | |
| 5,326,202 A | 7/1994 | Stubbs | |
| 5,402,557 A | 4/1995 | Dalen | |
| 5,586,621 A * | 12/1996 | Moon et al. | 188/4 R |
| 5,586,849 A * | 12/1996 | Kissel et al. | 410/10 |
| 5,988,402 A | 11/1999 | Mayfield | |
| 6,006,676 A | 12/1999 | Creek et al. | |
| 6,139,231 A * | 10/2000 | Kissel | 410/20 |
| 6,186,727 B1 * | 2/2001 | Hamilton | 414/426 |
| 6,345,693 B1 * | 2/2002 | Yeo et al. | 187/211 |
| 2001/0050034 A1 | 12/2001 | Gross | |
| 2002/0117465 A1 | 8/2002 | Ehrgott | |
| 2002/0119035 A1 * | 8/2002 | Hamilton | 414/426 |
| 2005/0019126 A1 * | 1/2005 | Pingel | 410/30 |
| 2005/0115775 A1 * | 6/2005 | Thomson et al. | 188/4 R |

OTHER PUBLICATIONS

Advertisement for Baxley Trailer Company; Conroe Motorcycle Conversions, Inc.; PO Box 2581, Conroe, TX 77305, Ph (936)539-2341; Fax (936)539-5702; Email condor@lcc.net, product L.A. Chock "Loader Assistant" Patent #5,988,402.

Article in *BMW Owners News*, issued Feb. 2001, written by Kit J. Vercella, p. 49, entitled, "L.A. Chock".

(Continued)

*Primary Examiner*—Bruce A. Lev
(74) *Attorney, Agent, or Firm*—Kenneth L. Nash

(57) ABSTRACT

The present invention provides a system and method for highly flexible placement of one or more wheel chocks on a transport to thereby support one or more motorcycles. The wheel chocks are preferably mounted to the transport utilizing flexible straps. When the straps are under tension, then the wheel chock is urged in a first direction towards the motorcycle wheel. Additional straps may secure the motorcycle to the transport such that when the additional straps are under tension then the motorcycle is urged in a second direction toward the wheel chock. In a preferred embodiment, the first direction and second direction are substantially opposite so that movement of the wheel chock and motorcycle is prevented.

17 Claims, 2 Drawing Sheets

OTHER PUBLICATIONS

Article in *Motorcycle Consumer News*, issued Nov. 2000, written by Dave Searle, p. 48, entitled, "L.A. Chock".

Advertisement for Mac's Original Quality Hardware, 800-666-1586, product Deck Hardware WC-1 "Adjustable Motorcycle Wheel Chock".

Brochure for Slik Stuff, PO Box 36, Salida, Colorado 81201, Ph(877) 754-5788, Fax (719)539-7755, www.slikstuff.com product "Slik Stand" and "Slik Chock" with "Rear Shoe".

Advertisement for Pingel Enterprise, Inc., 2072 11th Ave., Adams, WI 53910 Ph (608)339-7999, Fax (608)339-9164, product "Pingel Wheel Chock—Removable Model".

* cited by examiner

STRAP MOUNTED MOTORCYCLE CHOCK AND METHOD

TECHNICAL FIELD

The present invention relates generally to transporting motorcycles and, more particularly, to a strap mounted chock for securely supporting the motorcycle.

BACKGROUND ART

Motorcycle wheel chocks are commonly utilized when transporting motorcycles. The wheel chock provides a support for the motorcycle wheel. However, prior art wheel chocks have many problems. The patents discussed below illustrate numerous attempts made in the past to solve the various problems associated with motorcycle wheel chocks. Wheel chock problems often revolve around the time required for installation, removal, or relocation, and/or structural changes required to trailers and other transports, manufacturing costs, and/or the size or complexity of the structure required for mounting the wheel chock. Other problems relate to the supporting structure and the stability of the mounting. For instance, after mounting one or more chocks in a trailer, it may be desirable to transport differently sized motorcycles or a different number of motorcycles than the original mounting was made for. Motorcycles to be transported may be of different lengths, weights, or the like. It may also be desirable to utilize the transport for other purposes, thereby requiring the removal of one or more wheel chocks.

The following patents describe previous attempts made in the prior art to address the above problems:

U.S. Pat. No. 5,988,402, issued Nov. 23, 1999, to W. R. Mayfield discloses a motorcycle stand including a primary capture mechanism that consists of a transverse rod on which are mounted two vertical capture plates that translate inward as the motorcycle tire enters the stand. The capture plates are mounted for rotation orthogonally to the translation concomitantly with a tire contact plate. Translation of the plates is accomplished by the spring action and location of a pair of compressible pivot rods that have one end mounted forward and outward of the main rotation axis of the tire contact plate and the other end affixed to the sides of the capture plates. Forward rotation of the primary capture mechanism results in inward translation of the capture plates until they contact the tire sidewall. Further rotation results in compression of the springs in each pivot rod. A second, upper engagement shoe cooperates to ensure that the tire is fully captured. Accommodation of wider tires is accomplished by a longer and more compressible pivot rod or by providing a second, outward location for the compressible pivot rod which will allow capture of the widest of motorcycle rear tires.

U.S. Patent Application Publication 2002/0117465 A1, filed Jan. 15, 2002, to G. A. Ehrgott discloses a mounting device support member, comprising: (a) at least one rigid mounting body comprising a first lateral end and a second lateral end; (b) a first retention device attached to the first lateral end of the rigid mounting body and an opposing second retention device attached to the second lateral end of the rigid mounting body, the retention device comprising: (i) a cargo control track insert, the insert having upper and lower notches which define at least one adjacent resilient finger which extends beyond the opposing edges of a receiving member receptacle, (ii) a positive engagement latch, movably mounted on the retention device, the positive engagement latch being movable between a notch blocking position and a release position, and (iii) a positive engagement latch operating means, mounted on the retention device, capable of selectively enabling moving the positive engagement latch between the notch blocking position and the release position. The present invention further provides a wheel chock device for supporting a vehicle. Finally, this provides a method for storage of implements comprising using the provided storage system.

U.S. Patent Application Publication No. 2001/0050034 A1, published Dec. 13, 2001, to L. G. Gross, discloses a skid having a platform with a top, a bottom, a first side, a first elongated tube extending along the length of the first side, a second side, a second elongated tube extending along the length of the second side, a front end, a rear end, and one or more channels in the top positioned longitudinally in the platform, thereby creating a first top panel and a second top panel, wherein the platform is formed from a single sheet of material, e.g., metal or a composite. Two fork pockets are secured to the top of the platform traverse to the channels, thereby defining front and rear channel portions. A front end cap is secured to the top of the platform at the front end, and a center piece is secured to the top of the platform at a predefined fixed distance between the front end cap and the first fork pocket. A plurality of corrugations are formed optionally on the first fork pocket and the second fork pocket, and are formed optionally on the first top panel and the second top panel. Two or more rear end caps are secured to the top of the platform at the rear end. A method for making the skid uses a single flat sheet of material to form the platform, or alternatively, to form two or more portions of the platform that are joined along one or more seams. A method for recycling the skid receives the skid and either reuses, refurbishes, or recycles its component parts depending on the skid's condition.

U.S. Patent Application Publication No. 2002/0119035 A1, published Aug. 29, 2002, to S. P. Hamilton discloses a transporting assembly for maneuvering a motorcycle around a garage or onto the back bed of a tow truck. The transporting assembly includes a rear chock associated with the back side of the front wheel, a front chock associated with the front side of the front wheel, and a dolly coupled to both front and rear chocks. The dolly has an actuator that causes the dolly to extend two of its arms to raise the transporting assembly off the floor, so that when the front wheel of the cycle is strapped onto the transporting assembly, as the dolly is actuated, the transporting assembly, along with the front wheel of the cycle, raises off of the floor. The free ends of the arms are coupled to a wheel so that the entire transporting assembly and the cycle may be maneuvered about the floor by a single operator.

U.S. Pat. No. 5,402,557, issued Apr. 4, 1995, to T. M. Dalen, discloses a tie-down device of the type comprising an inelastic element, a locking device, and an elastic element. The elastic element is used to maintain tie-down tension under conditions where the use of an inelastic tie-down alone could develop slack thereby resulting in the failure of the tie-down. Applications where dynamic forces similar to those encountered by trailers carrying motorcycles will benefit from the use of this tie-down device.

U.S. Pat. No. 6,006,676, issued Dec. 28, 1999, to Creek et al., discloses a packaging skid or pallet having a base including a bottom surface, two side surfaces and two end surfaces. A pair of longitudinally extending channel members are secured to the base and define cavities for receiving lifting forks associated with a lift truck. A number of transversely extending cross members are secured to the channel members and/or the base. A first support tray is fixed to the base between the channel members and two cross members for receiving and retaining a front wheel associated with a motorcycle. A second support tray is fixed to the base between the channel members and two different cross members. A chock is positioned within the second support tray to support aback wheel of the motorcycle. The chock can be repositioned within the second support tray to accommodate motorcycles having different wheelbases. The components of the skid are formed from light weight rolled steel to resist corrosion and to reduce weight compared to a comparable wooden skid.

U.S. Pat. No. 5,301,817, issued Apr. 12, 1994, to S. G. Merritt, discloses a stand which is to be placed on a supportive surface which is to engage in a supporting manner with the front wheel of a motorcycle. The stand is to support the motorcycle in its normal upright position. The stand includes a backbone member within which the front wheel of the motorcycle is to be cradled in a closely conforming manner. Associated with the backbone member is a right side support and a left side support which are located in a facing relationship with the backbone member located there between. Both the right side support and the left side support are adjustably mounted on the backbone member so as to vary the spacing between the supports so as to accommodate different sizes of tires of motorcycles.

U.S. Pat. No. 3,785,517, issued Jan. 15, 1974, to W. D. Brajkovich, discloses a sturdy light weight means for holding a motorcycle in upright rigid position during transporting in a truck, trailer, and the like which includes a base plate secured in the truck or trailer upon which a curved channel is pivotly mounted. The channel suitably receives the size and shape of the front wheel of a motorcycle and extends in supporting contact for not less than one hundred eighty degrees.

U.S. Pat. No. 5,326,202, issued Jul. 5, 1994, to K. A. Stubbs, discloses a strapping system for maintaining a motorcycle in an upright position during transport including two interconnected straps with cuffs engaging the grips of the handle bars.

U.S. Pat. No. 4,437,597, issued Mar. 20, 1984, to R. H. Doyle, discloses a mounting apparatus for a vehicle with wheels having tires thereon which includes support means including a tire-engaging securing member for preventing vehicle movement in a first direction by engagement with one of the tires, and apparatus for preventing vehicle movement in a second direction opposite from the first direction by engaging the tire, and including a second securing member which has a tire-engaging portion and is pivotal about a first pivot on the support means for movement to and from a tire engaging position, and a third securing member which is pivotally mounted for movement into and from a tire-engaging position. The third securing member is preferably pivotally mounted at a second pivot which is on an end portion of the second securing member opposite from the tire-engaging portion of the second member, thus to cause displacement of the second pivot to urge the engaging portion of the third member into engagement with the tire when the second securing member is pivotally moved into its tire-engaging position.

The above cited prior art does not provide an inexpensive, easily installable, easily positionable or removable, wheel chock. Consequently, there remains a need to provide an improved wheel chock construction. Those of skill in the art will appreciate the present invention which addresses the above problems and other significant problems.

SUMMARY OF THE INVENTION

Accordingly, it is an objective of the present invention to provide an improved wheel chock system and method.

An objective of one preferred embodiment of the present invention is to provide a strap-mounted wheel chock and method for mounting a motorcycle.

These and other objectives, features, and advantages of the present invention will become apparent from the drawings, the descriptions given herein, and the appended claims. However, it will be understood that the above-listed objectives of the invention are intended only as an aid in understanding aspects of the invention, and are not intended to limit the invention in any way, and therefore do not form a comprehensive or restrictive list of objectives, and/or features, and/or advantages of the invention.

The present invention comprises a system for mounting a wheel chock to a transport to support a motorcycle wherein the motorcycle may have a first wheel and a second wheel on opposite ends thereof. The invention may comprise one or more elements such as, for instance, a wheel chock for engaging the first wheel and a first plurality of wheel chock straps connected to the wheel chock, the first plurality of wheel chock straps being connected to the transport to limit movement of the wheel chock with respect to the transport. The system may further comprise the wheel chock and the first plurality of wheel chock straps being connected such that when under tension the wheel chock straps urge the motorcycle in a first direction with respect to the transport. Additionally a first plurality of motorcycle straps may be attached to the motorcycle and connected to the transport such that when under tension the first plurality of motorcycle straps urge the motorcycle in a second direction opposite to the first direction whereby the motorcycle is held in a stationary position with respect to the transport.

The system may further comprise a second plurality of motorcycle straps connected to the motorcycle and the transport for limiting lateral movement of the second wheel with respect to the transport. If desired, the first plurality of wheel chock straps may be connected to the plurality of these same transport connectors.

In one embodiment, the first plurality of wheel chock straps are connected to a lower portion of the wheel chock. The system may further comprise a second plurality of wheel chock straps connected to an upper portion of the wheel chock.

In operation, a method of the present invention may comprise one or more steps such as, for instance, providing a wheel chock sized for the first wheel, connecting a plurality of wheel chock straps to the wheel chock and/or mounting the wheel chock to the transport by connecting the plurality of wheel chock straps to the transport.

The method may further comprise biasing the motorcycle in a first direction with respect to the transport utilizing the plurality of wheel chock straps under tension and/or biasing the motorcycle in a second direction with respect to the transport utilizing the first plurality of straps under tension. The first direction and the second direction may preferably be opposing directions such that the motorcycle is held in a stationary position with respect to the transport.

In operation, another method for transporting one or more motorcycles on a transport may comprise one or more steps such as, for instance, mounting a first wheel chock to the transport utilizing only straps and engaging a first motorcycle wheel with the first wheel chock. The method may further comprise mounting a second wheel chock to the transport utilizing only straps, and engaging a second motorcycle wheel with the first wheel chock. The method may further comprise removing the first motorcycle and the second motorcycle from the transport, and loading a third motorcycle and a fourth motorcycle to the transport. The third motorcycle and the fourth motorcycle may be sized differently than the first motorcycle and the second motorcycle to thereby require different positioning the first wheel chock and the second wheel chock at different positions on the transport.

Thus, the method may also comprise selecting a desired first position on the transport at which to locate the first wheel chock. Other steps in accord with the present invention may comprise removing the first wheel chock from transport without leaving or removing mechanical fasteners at the first position.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein.

While the present invention will be described in connection with presently preferred embodiments, it will be understood that it is not intended to limit the invention to those embodiments. On the contrary, it is intended to cover all alternatives, modifications, and equivalents included within the spirit of the invention.

GENERAL DESCRIPTION AND PREFERRED MODES FOR CARRYING OUT THE INVENTION

Figure 1:
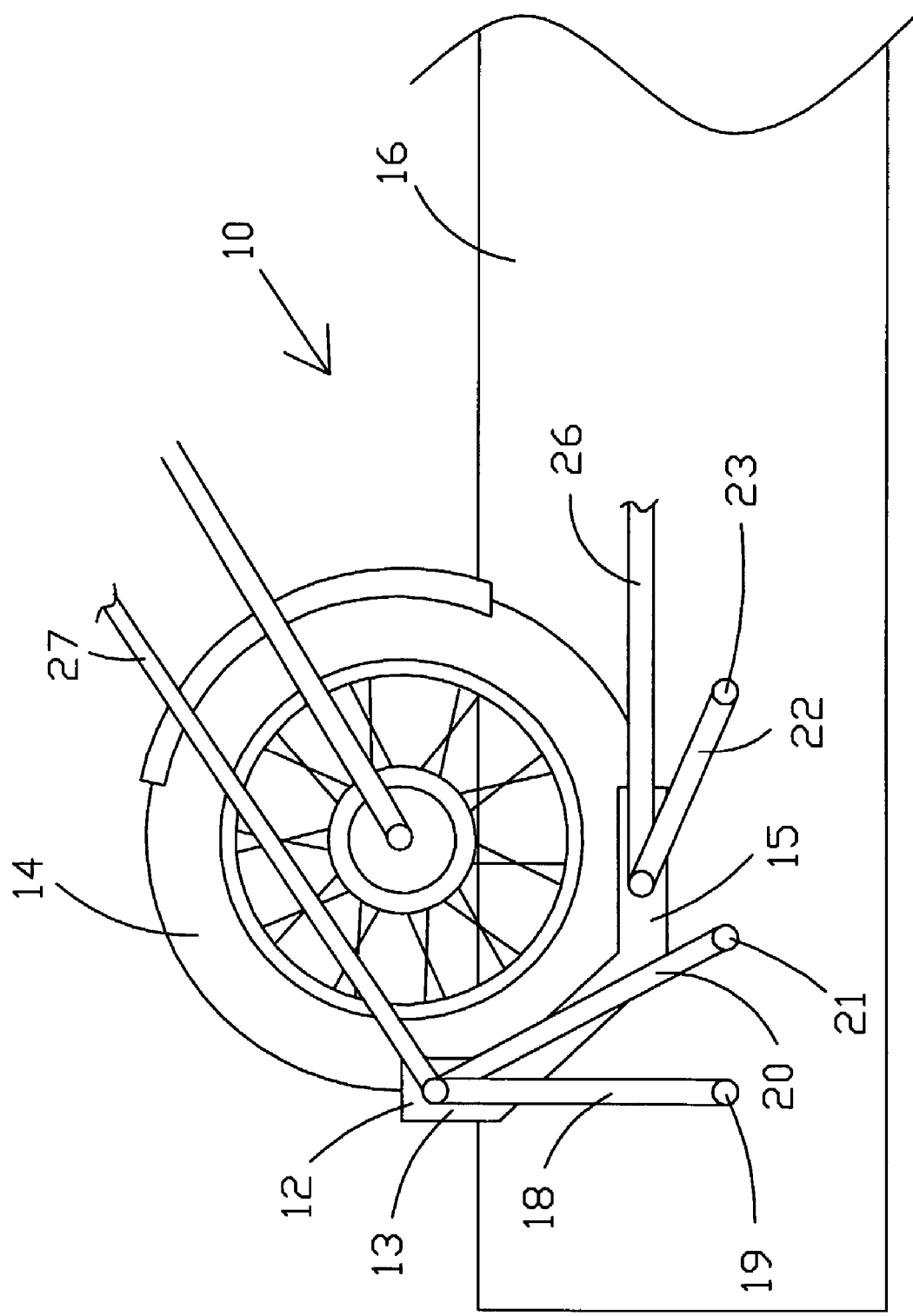
FIG. 1 is an elevational view of a strap-mounted wheel chock in accord with the present invention.

Now referring to the drawings, and more particularly to FIG. 1, there is shown an elevational view of strap mounted wheel chock 10 present invention. Wheel chock 12 maybe of many different designs and one possible embodiment is shown. However, the present invention may utilize virtually any construction of a motorcycle wheel chock. The wheel chock is utilized to support the motorcycle wheel during transport, storage, or the like as needed. A wheel chock in accord with the present invention preferably has a substantially U-shaped cross section for receiving a wheel. The wheel chock may be sized according to the size of the wheel. The wheel chock preferably engages the motorcycle wheel around a sufficiently sized arc of the wheel so as to be able to support the wheel to prevent movement of the motorcycle. It will be understood herein that motorcycle may refer generally to any motorized two-wheeled vehicle and could also apply to bicycles or other types of vehicles where a strap-mounted wheel chock would be useful.

Thus, wheel chock 12 is not required to be affixed to support structure 16 with screws, nails, or the like as are prior art wheel chocks utilized for transporting motorcycles. Support structure 16 may include trailers, trailer trucks, and the like onto which the motorcycle is loaded for transport. In accord with the present invention, wheel chock 12 is mounted to structure 16 utilizing a plurality of straps. FIG. 1 shows various examples of possible strap connections such as straps 18, 20, 22, 26, and 27. While it is normally desirable to provide straps on opposite sides of wheel chock 12, so that a plurality of straps is normally utilized, it will be understood that FIG. 1 simply shows possible locations of straps and it is not intended that all sets of straps will necessarily be utilized. For instance, only straps 26 are utilized in the configuration shown in FIG. 2, which is discussed hereinafter. Straps may be mounted to an upper portion 13 or a lower portion 15 of wheel chock 12. Any suitable type of connector may be used to secure the straps to the transport as discussed in some more detail hereinafter. As examples, straps 18, 20, and 22 may be secured to transport connectors 19, 21, and 23.

Figure 2:
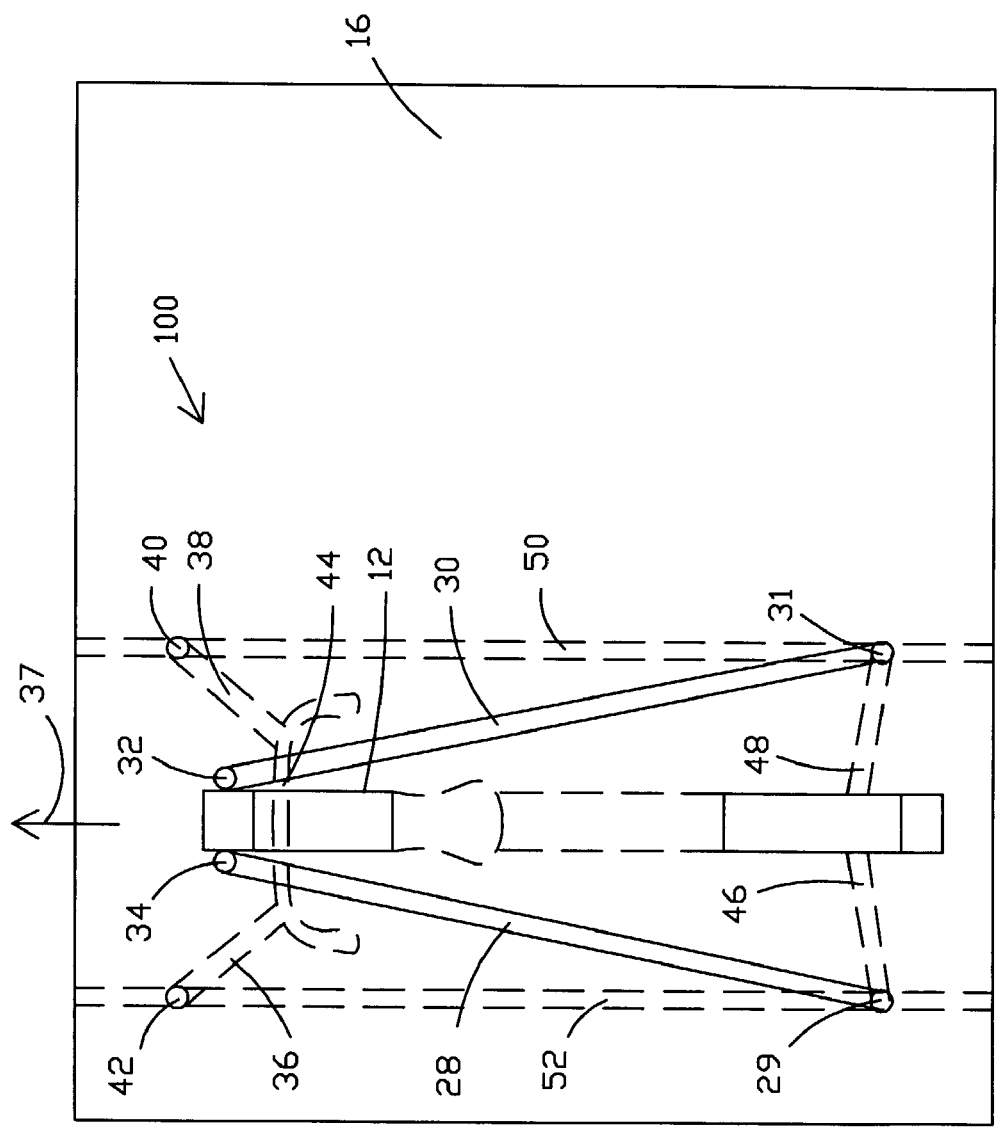
FIG. 2 is a plan schematic for mounting a motorcycle utilizing a strap-mounted wheel chock in accord with the present invention.

FIG. 2 shows one possible mounting configuration 100 wherein a pair of straps 28 are secured to either side of wheel chock 12. In the example of FIG. 2, strap pair 28 and 30 are secured to mounting platform or transport 16 by any suitable rearward strap connections 29 and 31. Strap pair 28 and 30 are also affixed to wheel chock 12 on opposite sides thereof by any suitable strap mounting 32 and 34. In this configuration, the transport moves forward in the direction indicated by arrow 37. Thus, as with prior art wheel chocks, the motorcycle is prevented from moving in the forward direction with respect to support 16 by wheel chock 12. Straps 36 and 38 may attach to the handlebars 44 or other convenient connections on the motorcycle and, in this example, are connected to forward strap connectors 40 and 42. It will be understood that when the above described straps 28 and 30 are tightened, that the motorcycle is now immobilized from moving in either the forward or reverse direction with respect to platform 16. Additional straps to further secure the motorcycle include straps which may in this configuration, if desired, also connect to strap connectors 29 and 31. Thus, in this configuration six straps 46, 48, 36, 38, and 28 and 30 are utilized to secure the motorcycle from movement forward, laterally, or tilting. It will be noted that straps 22 and/or 26 when tensioned urge the motorcycle rearwardly with respect to the transport 16 while straps 36 and 38 attached to the motorcycle urge the motorcycle frontwardly or in an opposite direction to thereby affix the motorcycle in one position. Other straps could also be attached to the motorcycle to provide the force on the motorcycle provided by straps 36 and 38.

It will be immediately recognized by those of skill in the art that because wheel chock 12 is not affixed to platform 16 that wheel chock 12 may be placed in other positions without modifying any mountings to platform 16 as is required with prior art wheel chocks used for transporting motorcycles. Thus, different size motorcycles and different numbers of motorcycles can be transported without the need for modifying the chock mounting hardware. This is a significant advantage over prior art motorcycle wheel chocks.

The strap mounting means may include any suitable mountings which are normally available on trailers and transports. In many cases, rails may already be mounted such as rails 50 and 52 to which rings or clamps may be mounted. Other types of mountings for straps may also be utilized such as D rings or other types of rings, recessed D rings, swivel rings, surface mounted rings, and the like. Such types of mountings are generally always available with most motorcycle transport platforms. Thus, effectively no changes to the trailer or transport may be required in order to use the present invention. This is yet another major advantage of the present invention over prior art motorcycle wheel chocks. This greatly simplifies and may normally eliminate the need to make any modifications at all to the transport. In the prior art such modifications to utilize wheel chocks were time consuming, caused major changes in the transport, were complex, and difficult.

Commercial rigging straps, shock cords, tie-downs, chains or the like may be utilized for straps in accord with the present invention. Tensionser devices may be utilized to tighten the straps. Such straps may also include elastic sections placed under tension to maintain the tension in the case of shifting or the like. While the present embodiment preferably utilizes flexible straps, rigid straps such as telescoping metal members could also be utilized to affix the motorcycle in position. Thus, the present invention contemplates a wide variety of straps that could be utilized.

While straps from chock 12 preferably extend to the transport for mounting in accord with the present invention, other straps such as straps 27 could be utilized for attachment to the motorcycle itself for pulling the motorcycle into motorcycle wheel chock 12. Thus, various combinations straps for securing the motorcycle with respect to wheel chock 12 and for mounting wheel chock 12 to the transport may be utilized in accord with the present invention. Upper chock 13 may be connected by straps 18 to prevent lateral movement of wheel chock 12 and front wheel 14 of motorcycle as well as to prevent any tilting movement. Long straps 26 as shown in FIG. 1, and connected to lower chock portion 15, are comparable to the long straps 28 and 30 shown in configuration 100 of FIG. 2 to prevent forward movement of chock 12 and to pull chock 12 into wheel 14 when under tension. If desired, shorter straps such as short straps 22 shown in FIG. 1 could also be utilized for the same purpose.

As stated above, chock 12 may be of many different configurations. Chock 12 may or may not have a base plate that extends outwardly from the chock to provide additional stability prior to mounting. Wheel chock 12 is preferably made of a rigid material such as metal, fiberglass, composits, or the like, with suitable tensile strength for resisting forward momentum of a heavy motorcycle during transport stops. However, if desired, suitable fabrics or other flexible materials may be utilized in conjunction with the strap mounting to provide a strap-mounted wheel chock in accord with the present invention.

The foregoing disclosure and description of the invention is therefore illustrative and explanatory of a presently preferred embodiment of the invention and variations thereof, and it will be appreciated by those skilled in the art, that various changes in the design, manufacture, layout, organization, order of operation, means of operation, equipment structures and location, methodology, the use of mechanical equivalents, as well as in the details of the illustrated construction or combinations of features of the various elements may be made without departing from the spirit of the invention. As well, the drawings are intended to describe the concepts of the invention so that the presently preferred embodiments of the invention will be plainly disclosed to one of skill in the art but are not intended to be manufacturing level drawings or renditions of final products and may include simplified conceptual views. Thus, various changes and alternatives may be used that are contained within the spirit of the invention. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. A system for mounting a wheel chock to a transport to support a motorcycle, said motorcycle having a first wheel and a second wheel on an opposite end of said motorcycle from said first wheel, comprising:
   a wheel chock for engaging said first wheel; and
   a first plurality of wheel chock straps connected to said wheel chock, said first plurality of wheel chock straps being attachable to said transport for preventing movement of said wheel chock with respect to said transport.

2. The system of claim 1 further comprising:
   said wheel chock and said first plurality of wheel chock straps being attachable such that when under tension said wheel chock straps urge said motorcycle in a first direction with respect to said transport, and
   a first plurality of motorcycle straps attachable to said motorcycle and said transport such that when under tension said first plurality of motorcycle straps urge said motorcycle in a second direction opposite to said first direction whereby said motorcycle is held in a stationary position with respect to said transport.

3. The system of claim 2, further comprising a second plurality of motorcycle straps attachable to said motorcycle and said transport for preventing lateral movement of said second wheel with respect to said transport.

4. The system of claim 3, further comprising a plurality of transport connectors secured to said transport for attaching said second plurality of motorstraps to said transport, said first plurality of wheel chock straps also being attachable to said plurality of transport connectors.

5. The system of claim 2, wherein said first plurality of wheel chock straps are connected to a lower portion of said wheel chock.

6. The system of claim 5, further comprising a second plurality of wheel chock straps connected to an upper portion of said wheel chock.

7. The method for mounting a wheel chock to a transport to support a motorcycle, said motorcycle having a first wheel and a second wheel on an opposite end of said motorcycle from said first wheel, said method comprising:
   providing a wheel chock sized for said first wheel;
   connecting a plurality of wheel chock straps to said wheel chock; and
   mounting said wheel chock to said transport by connecting said plurality of wheel chock straps to said transport.

8. The method of claim 7, further comprising:
   connecting a first plurality of motorcycle straps between said motorcycle and said transport;
   biasing said motorcycle in a first direction with respect to said transport utilizing said plurality of wheel chock straps under tension; and
   biasing said motorcycle in a second direction with respect to said transport utilizing said first plurality of straps under tension, said first direction and said second direction being opposing such that said motorcycle is held in a stationary position with respect to said transport.

9. The method of claim 8, wherein said first direction and said second direction are substantially opposite directions.

10. The method of claim 9 further comprising connecting a second plurality of motorcycle straps between said motorcycle and said transport such that said second wheel of said motorcycle is prevented from moving laterally with respect to said trailer.

11. The method of claim 7, further comprising connecting a second plurality of straps between said wheel chock and said motorcycle.

12. A method for transporting one or more motorcycles on a transport, said method comprising:

mounting a first wheel chock to said transport utilizing only straps; and engaging a first motorcycle wheel with said first wheel chock.

13. The method of claim 12, further comprising:

mounting a second wheel chock to said transport utilizing only straps, and engaging a second motorcycle wheel with said first wheel chock.

14. The method of claim 12, further comprising:

selecting a desired first position on said transport at which to locate said first wheel chock.

15. The method of claim 14, further comprising:

removing said first wheel chock from transport without leaving or removing mechanical fasteners at said first position.

16. The method of claim 13, further comprising:

removing said first motorcycle and said second motorcycle from said transport, and loading a third motorcycle and a fourth motorcycle to said transport, said third motorcycle and said fourth motorcycle being sized differently than said first motorcycle and said second motorcycle to thereby require different positioning said first wheel chock and said second wheel chock at different positions on said transport.

17. The method of claim 12, further comprising:

providing a plurality of straps affixed with respect to said first motorcycle and said transport such that when said straps are under tension that said motorcycle is urged in the direction of said first wheel chock.

* * * * *